US007937542B2

(12) United States Patent
Hosoya et al.

(10) Patent No.: US 7,937,542 B2
(45) Date of Patent: May 3, 2011

(54) STORAGE CONTROLLER AND STORAGE CONTROL METHOD FOR ACCESSING STORAGE DEVICES IN SUB-BLOCK UNITS

(75) Inventors: Mutsumi Hosoya, Fujimi (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 659 days.

(21) Appl. No.: 12/007,531

(22) Filed: Jan. 11, 2008

(65) Prior Publication Data
US 2008/0263289 A1 Oct. 23, 2008

(30) Foreign Application Priority Data

Apr. 20, 2007 (JP) ................................. 2007-112363

(51) Int. Cl.
*G06F 12/00* (2006.01)
(52) U.S. Cl. .......................... 711/154; 711/156; 711/100
(58) Field of Classification Search .................. 711/100, 711/154, 156
See application file for complete search history.

(56) References Cited

U.S. PATENT DOCUMENTS

| 7,685,360 B1* | 3/2010 | Brunnett et al. ............... 711/112 |
| 2002/0184556 A1* | 12/2002 | Hashemi ............................ 714/6 |
| 2006/0161756 A1 | 7/2006 | Yagisawa et al. |

FOREIGN PATENT DOCUMENTS

JP 2006-195851 1/2005

* cited by examiner

*Primary Examiner* — Mardochee Chery
(74) *Attorney, Agent, or Firm* — Volpe and Koenig, P.C.

(57) ABSTRACT

Provided are a storage controller and a storage control method capable of improving the transaction performance. This storage controller includes a disk controller for receiving a read command and a write command from a host computer, and an external disk controller and an internal disk device for sending and receiving data to and from the disk controller. A storage device of the external disk controller or the internal disk controller processes the access from the disk controller in physical sub-block units. When the disk controller is to access the storage device of the external disk controller or the internal disk device in logical sub-block units in which an additional code containing a guarantee code is added to user data, it makes such access in minimum common multiple units of logical sub-blocks and physical sub-blocks, and changes the guarantee code length.

12 Claims, 15 Drawing Sheets

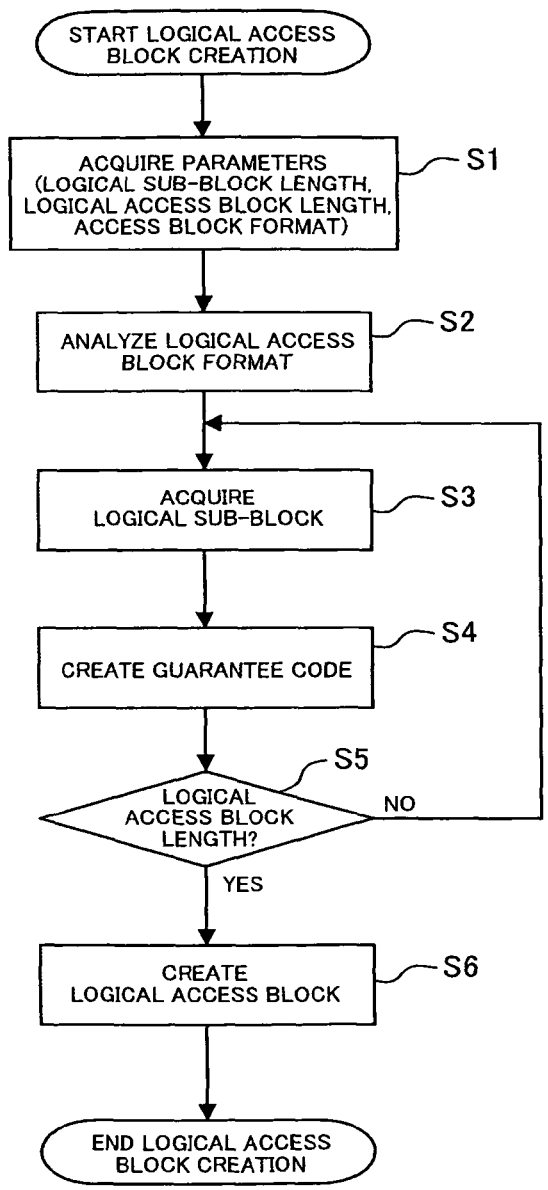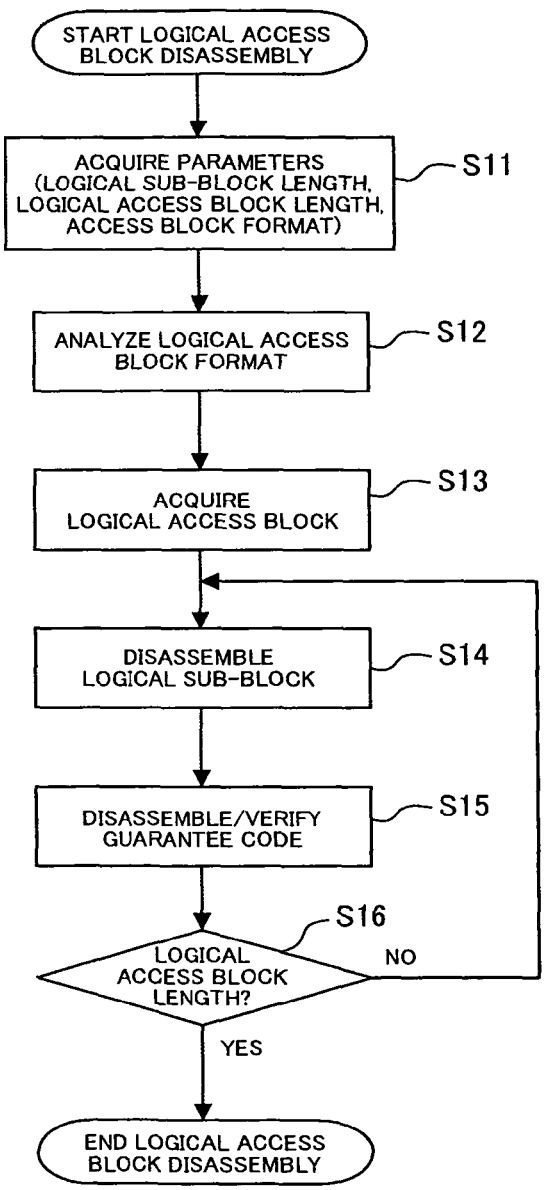

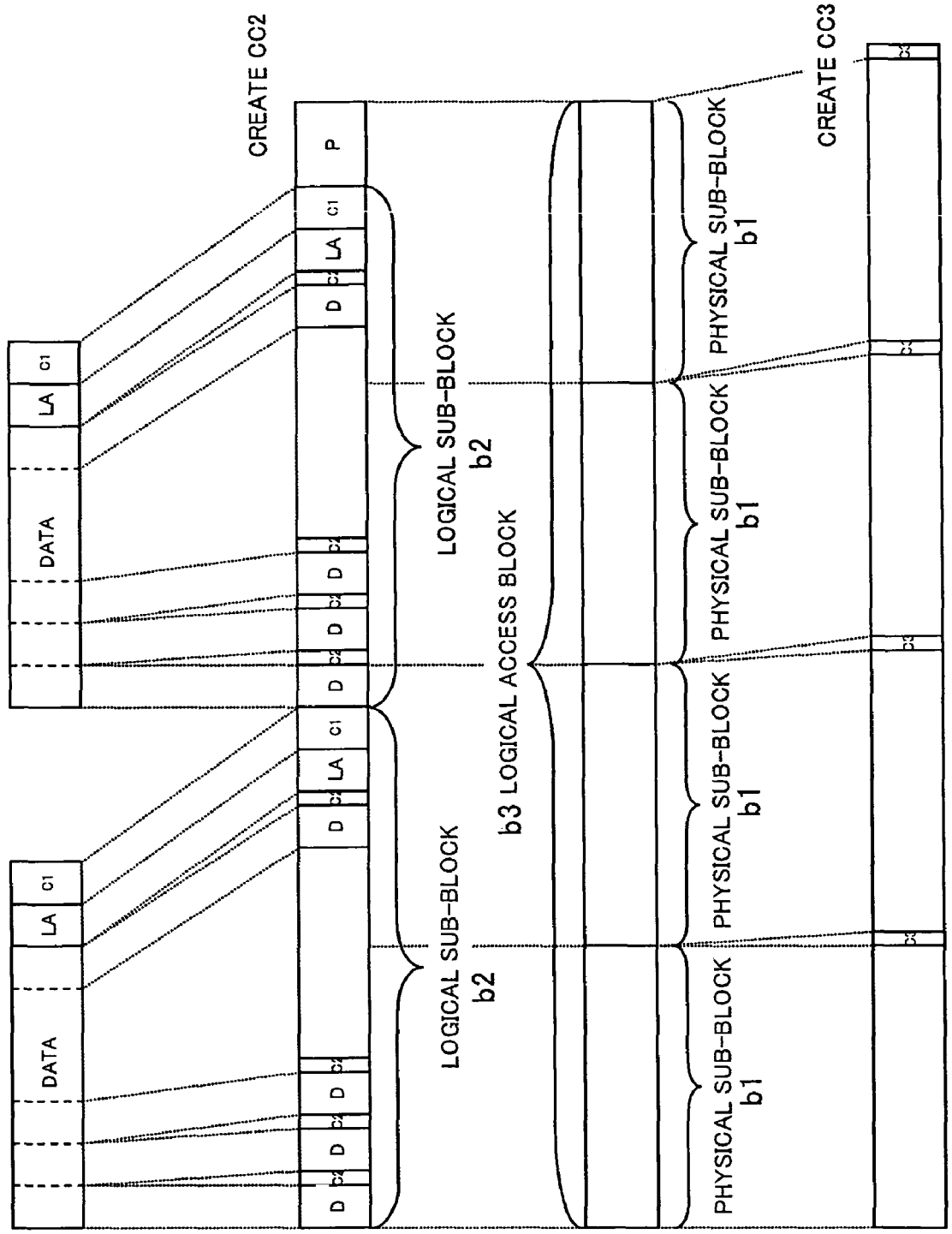

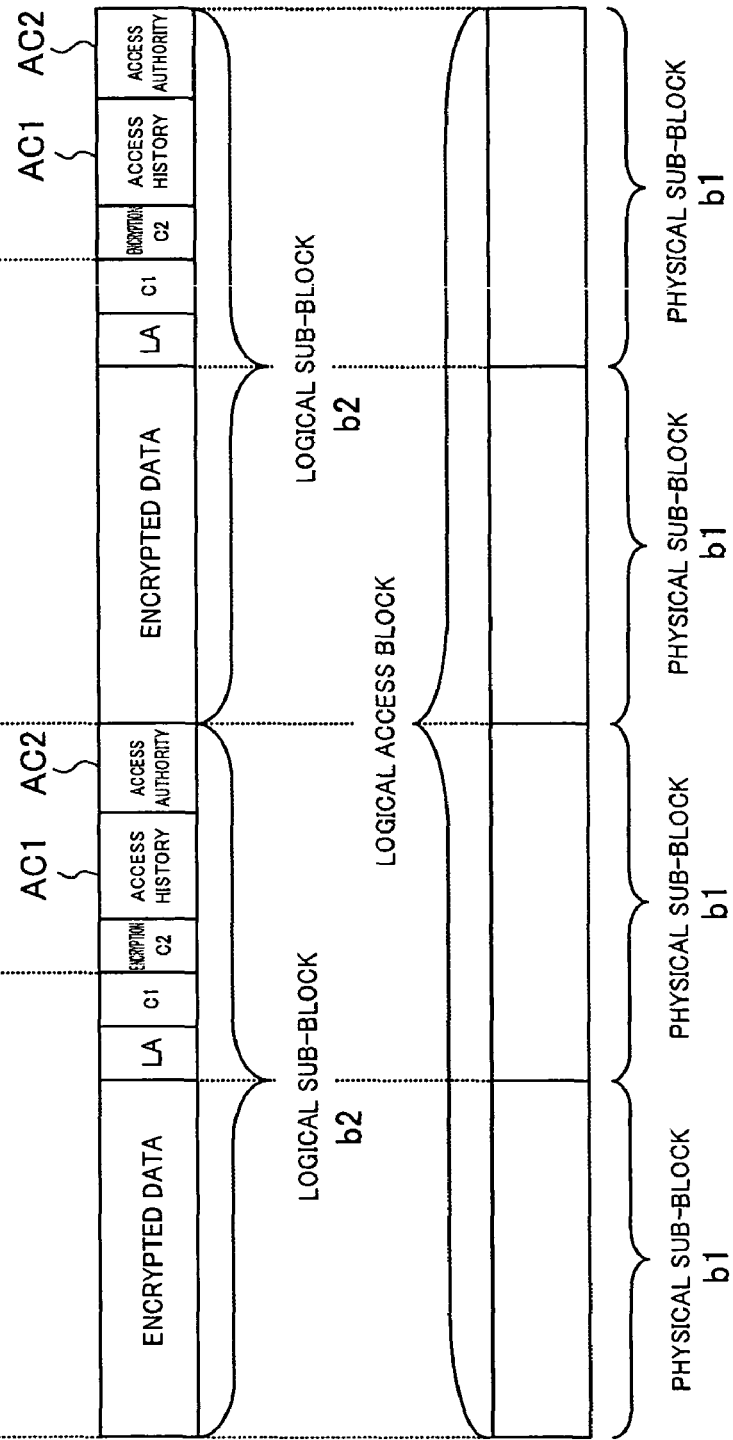

FIG.9A

| REQUESTED DATA UTILIZATION | HIGH | MEDIUM | LOW |
|---|---|---|---|
| REQUESTED TRANSACTION PERFORMANCE | LOW | MEDIUM | HIGH |
| GUARANTEE CODE LENGTH | 0 | 64 | 128 |

FIG.9B

| DATA CONVERSION | PLAIN TEXT | ENCRYPTED | COMPRESSED | COMPRESSED + ENCRYPTED |
|---|---|---|---|---|
| GUARANTEE CODE LENGTH | 8 | 16 | 16 | 32 |

FIG.9C

| 1 BIT CORRECTABLE INFORMATION BLOCK | 247 | 120 | 57 | 26 | 11 | 4 |
|---|---|---|---|---|---|---|
| GUARANTEE CODE LENGTH | 8 | 16 | 32 | 64 | 256 | 512 |

FIG.10

| GUARANTEE CODE LENGTH | 0 | 8 | 16 | 32 | 64 | 128 | 256 | 512 |
|---|---|---|---|---|---|---|---|---|
| LOGICAL SUB-BLOCK LENGTH | 512 | 520 | 528 | 544 | 576 | 640 | 768 | 1024 |
| LOGICAL ACCESS BLOCK LENGTH | 512 | 33280 | 16896 | 8704 | 4608 | 2560 | 1536 | 1024 |
| DRIVE UTILIZATION | 1 (1D) | 0.98 (64D+1S) | 0.97 (32D+1S) | 0.94 (16D+1S) | 0.89 (8D+1S) | 0.80 (4D+1S) | 0.67 (2D+1S) | 0.50 (1D+1S) |
| AVAILABLE HAMMING CODE | | (255,247) | (127,120) | (63,57) | (31,26) | (31,26) | (15,11) | (7,4) |
| NUMBER OF ACCESS SUB-BLOCKS | \multicolumn{8}{c}{STAGING OVERHEAD: COMPARISON OF LOGICAL ACCESS BLOCK LENGTH AND I/O LENGTH ORIGINALLY REQUIRED BY PROCESSING} |

| NUMBER OF ACCESS SUB-BLOCKS | | | | | | | | |
|---|---|---|---|---|---|---|---|---|
| 1 | 1.0 | 65.0 | 33.0 | 17.0 | 9.0 | 5.0 | 3.0 | 2.0 |
| 2 | 1.0 | 32.5 | 16.5 | 8.5 | 4.5 | 2.5 | 1.5 | |
| 4 | 1.0 | 16.3 | 8.3 | 4.3 | 2.3 | 1.3 | | |
| 8 | 1.0 | 8.1 | 4.1 | 2.1 | 1.1 | | | |
| 16 | 1.0 | 4.1 | 2.1 | 1.1 | | | | |
| 32 | 1.0 | 2.0 | 1.0 | | | | | |
| 64 | 1.0 | 1.0 | | | | | | |

FIG.11

| CODE LENGTH (n=2m-1) | INFORMATION BIT (k=2m-1-m) | REDUNDANT BIT (m) | ENCODING RATIO |
|---:|---:|---:|---:|
| 3 | 1 | 2 | 0.33 |
| 7 | 4 | 3 | 0.57 |
| 15 | 11 | 4 | 0.73 |
| 31 | 26 | 5 | 0.84 |
| 63 | 57 | 6 | 0.90 |
| 127 | 120 | 7 | 0.94 |
| 255 | 247 | 8 | 0.97 |
| 511 | 502 | 9 | 0.98 |
| 1023 | 1013 | 10 | 0.99 |

US 7,937,542 B2

STORAGE CONTROLLER AND STORAGE CONTROL METHOD FOR ACCESSING STORAGE DEVICES IN SUB-BLOCK UNITS

CROSS REFERENCES

This application relates to and claims priority from Japanese Patent Application No. 2007-112363, filed on Apr. 20, 2007, the entire disclosure of which is incorporated herein by reference.

BACKGROUND

The present invention generally relates to a storage controller for controlling the input and output of data to be used by a host system, and in particular relates to technology of a controller and a storage device handling data of mutually different sizes in a storage controller having such a controller and a storage device to be accessed by the controller.

Known is a storage controller (storage apparatus) comprising a plurality of storage devices, and a controller for processing commands from a host system (host) and processing the input and output [of data] to and from a plurality of storage devices. The controller improves the reliability of data by adding a guarantee code to data from the host system. The controller inputs and outputs data in logical sub-block units upon accessing the storage device. Meanwhile, the storage device performs processing in physical sub-block units to the controller. When the storage device is a hard disk drive using ATA (AT Attachment) as its protocol, since the logical sub-block units (first block units) and the physical sub-blocks (second block units) will differ, a storage controller has been proposed for commanding the writing of data in the storage device in third block units having a size that is a common multiple of the respective units of logical sub-block units and physical sub-block units (refer to Japanese Patent Laid-Open Publication No. 2006-195851).

SUMMARY

With conventional technology, when the controller executes I/O processing of data according to a write command, consideration is given to the difference in size of the logical sub-block units and the physical sub-block units, and data is written in the storage device according to third block units having a size that is a common multiple of both sizes. Nevertheless, there is concern that the access units of data will increase, the overhead during random access will increase, the cache hit ratio will deteriorate, and the transaction performance will deteriorate.

Thus, an object of the present invention is to improve the transaction performance. Further, another object of the present invention is to improve the access to an externally-connected storage device.

In order to achieve the foregoing objects, the present invention is characterized in that it adjusts the balance of transaction performance and data utilization while securing data reliability by changing the guarantee code length upon making access in minimum common multiple units of logical sub-blocks and physical sub-blocks in which a guarantee code is added to a user code.

In order to achieve the foregoing objects, the present invention is also characterized in that it improves the reliability of data by using a data guarantee code stored in a side file and improves the access to an externally-connected driver upon accessing the externally-connected storage device (externally-connected drive).

In other words, the present invention provides a storage controller comprising a controller for receiving a read command and a write command from a host system, and a plurality of storage devices connected to the controller and from which data is read or to which data is written based on the control of the controller. The controller includes a logical sub-block unit setting unit for setting logical sub-block units in which an additional code containing a guarantee code is added to user data, and an additional code length setting unit capable of changing the code length of the additional code, and accesses the storage device in the logical sub-block units containing an additional code of a code length set with the additional code length setting unit. The storage device processes the access from the controller in physical sub-block units. The logical sub-block units and the physical sub-block units are of a different block size. The controller processes the access to and from the storage device in a specific block size configured from a common multiple of the logical sub-blocks and the physical sub-blocks.

As preferable modes of the present invention, the storage device includes an externally-connected storage device, and the controller sets the externally-connected storage device as an access target. There are a plurality of guarantee codes configuring the logical sub-block units. The controller includes an encryption unit for encrypting data to be subject to I/O processing to and from the host system or the storage device, a decryption unit for decrypting encrypted data among data from the host system or the storage device, and a data check unit for checking the reliability of data encrypted with the encryption unit or data decrypted with the decryption unit according to the guarantee code. The additional code length setting unit changes the additional code length according to the characteristics of a business application program of the host system. The additional code length setting unit shortens the additional code when transaction performance is requested, and lengthens the additional code when sequential performance is requested. The additional code contains pad data for giving user-designated information.

The present invention further provides a storage control method of controlling the input and output of data between a controller for receiving a read command and a write command from a host system, and a plurality of storage devices connected to the controller and from which data is read or to which data is written based on the control of the controller. The storage device executes a step of processing the access from the controller in physical sub-block units. The controller executes a first step of setting logical sub-block units in which an additional code containing a guarantee code and capable of changing the code length is added to user data, a second step of accessing the storage device in the logical sub-block units containing the additional code of a set code length, and a third step of processing the access to and from the storage device in a specific block size configured from a common multiple of the logical sub-blocks having a different block size than and the physical sub-blocks units, and the physical sub-blocks.

As preferable modes of the present invention, the controller further executes a fourth step of encrypting data to be subject to I/O processing to and from the host system or the storage device, a fifth step of decrypting encrypted data among data from the host system or the storage device, and a sixth step of checking the reliability of data encrypted with the encryption unit or data decrypted with the decryption unit according to the guarantee code. The first step includes a step of changing the additional code length according to the characteristics of a business application program of the host system. The first step includes a step of shortening the additional code when transaction performance is requested, and lengthening the additional code when sequential performance is requested.

According to the present invention, it is possible to improve the transaction performance while securing the reliability of data, as well as improve the access to an externally-connected drive.

DESCRIPTION OF DRAWINGS

FIG. 5A is a flowchart explaining logical access block creation processing, and FIG. 5B is a flowchart explaining logical access block disassembly processing;

FIG. 7A to FIG. 7D are diagrams explaining the configuration of a logical access block;

FIG. 8A to FIG. 8C are diagrams explaining the configuration of a logical access block;

FIG. 9A to FIG. 9C are diagrams explaining the selection policy of a guarantee code length, wherein FIG. 9A is a diagram explaining the selection based on data utilization and transaction performance, FIG. 9B is a diagram explaining the selection based on type of data conversion, and FIG. 9C is a diagram explaining the selection based on a 1 bit error correctable information block length;

FIG. 10 is a diagram showing the effect of the disk controller according to the present invention;

FIG. 11 is a diagram explaining the configuration of a hamming code;

DETAILED DESCRIPTION

Figure 1:
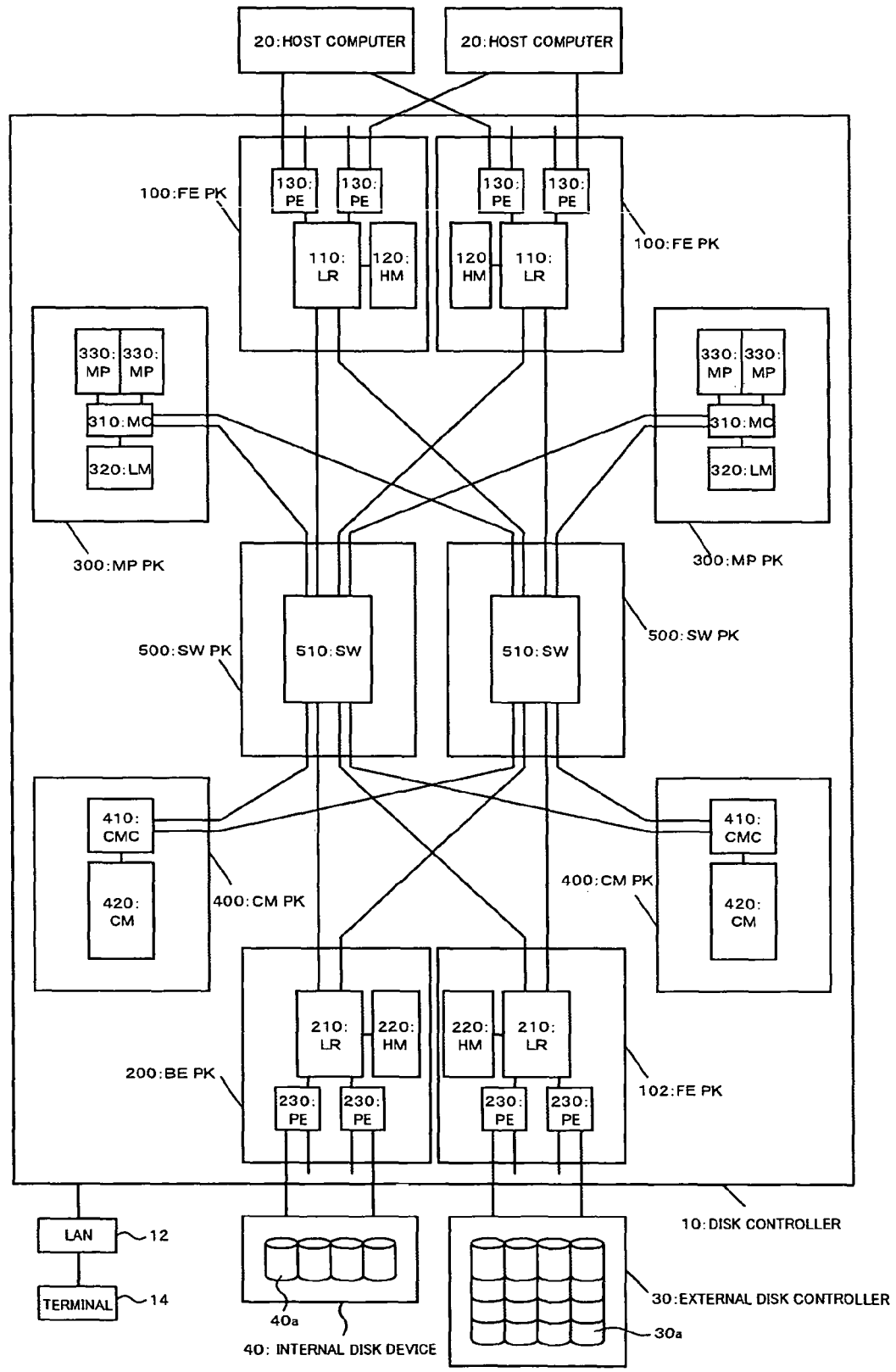
FIG. 1 is a block configuration diagram of a storage controller showing an embodiment of the present invention.

Embodiments of the present invention are now explained with reference to the attached drawings. FIG. 1 is a diagram showing the block configuration of a storage controller applying an embodiment of the present invention. In FIG. 1, the storage controller comprises a disk controller 10 and an internal disk device 40, and the disk controller 10 is connected to two host computers 20 as host systems, and the internal disk device 40 and an external disk controller 30 via a communication network such as a fibre channel, and connected to a management terminal 14 via a LAN 12.

The internal disk device 40 includes a plurality of storage devices 40a, the external disk controller 30 includes a plurality of storage devices 30a, and the disk controller 10 is configured as a controller for receiving a read command and a write command from each host computer 20 so as to control the input and output of data to and from the storage devices 40a of the internal disk device 40 or the storage devices 30a of the external disk controller 30. When the disk controller 10, as the controller, accesses the respective storage devices 40a, 30a in minimum common multiple units of logical sub-blocks and physical sub-blocks in which a guarantee code is added to user data, it adjusts the balance of the transaction performance (number of IOs (inputs and outputs) that can be processed per unit time) and data utilization while securing the reliability of data by changing the guarantee code length. When the disk controller 10 accesses the storage device 30a of the external disk controller 30, it improves the reliability of data and improves the access to the storage device 30a by using the data guarantee code stored in a side file.

Specifically, the disk controller 10 comprises two front-end packages 100, one front-end package 102, one back-end package 200, two microprocessor packages 300, two cache memory packages 400, and two switch packages 500, and each front-end package 100 is connected to the host computer 20, the front-end package 102 is connected to the external disk controller 30, and the back-end package 200 is connected to the internal disk device 40.

Each front-end package 100 comprises a local router (LR) 110, a host memory (HM) 120, and a plurality of protocol engines (PE) 130, the front engine package 102 comprises a local router 210, a host memory 220, and a plurality of protocol engines 230, and the back-end package 200 comprises a local router 210, a host memory 220, and a plurality of protocol engines 230.

Each microprocessor package 300 comprises a memory controller (MC) 310, a local router (LM) 320, and a plurality of microprocessors (MP) 330, and the cache memory package 400 comprises a cache memory controller (CMC) 410, and a cache memory (CM) 420. Each switch package 500 comprises a switch (SW) 510, and each switch 510 opens and closes the communication path mutually connecting the local router 110, the local router 210, the memory controller 310 and the cache memory controller 410.

Figure 2:
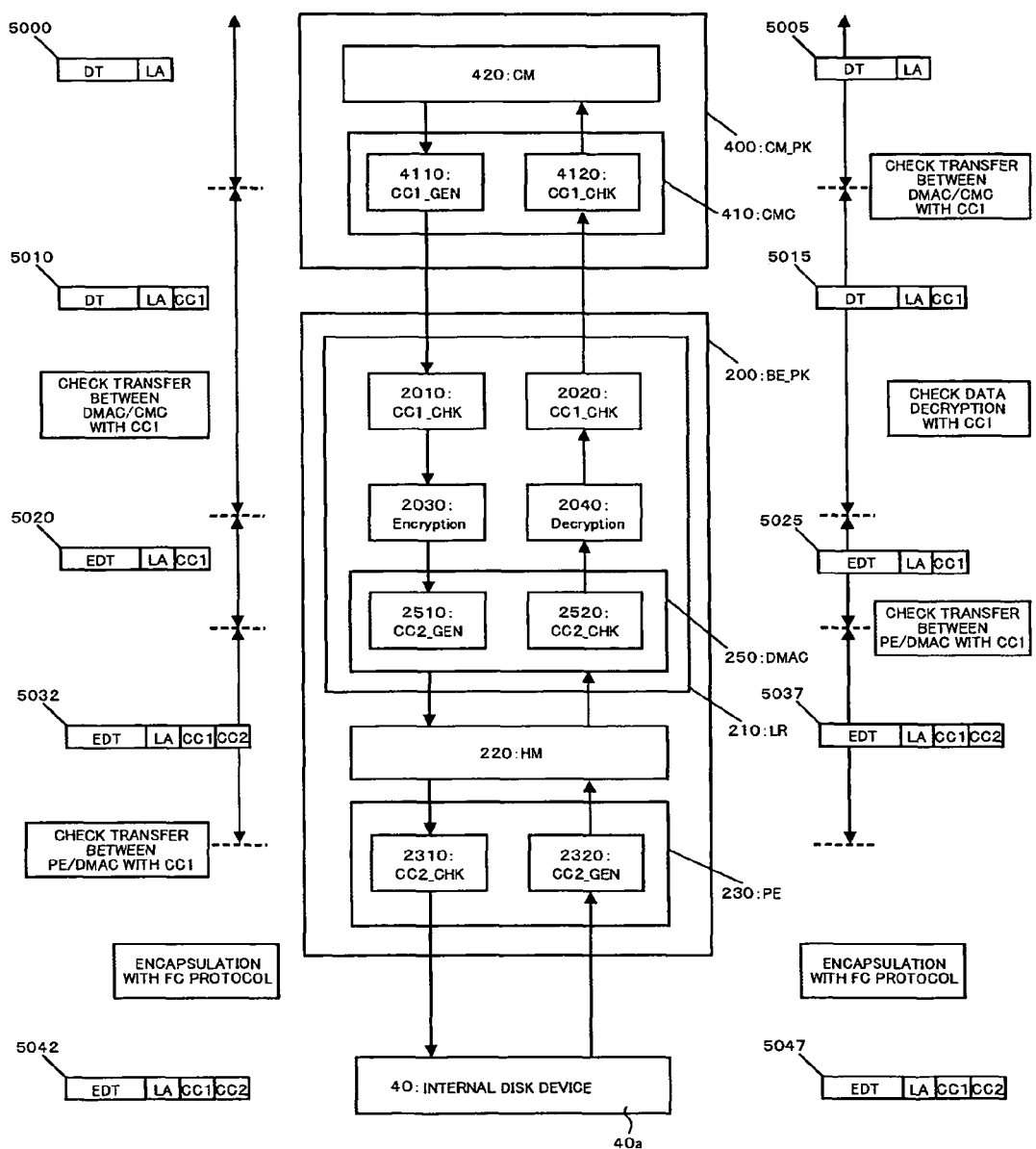
FIG. 2 is a diagram showing the function of a disk controller and the configuration of data for explaining the processing to be performed to an internally-connected drive.

The back-end package 200, as shown in FIG. 2, is able to control the input and output of data between the cache memory 420 and the internal disk device 40. Thereupon, the cache memory 420 stores a data body DT and a logical block 5000 containing a logical address LA, and the logical block 5000 stored in the cache memory 420 is output to the back-end package 200 as a logical block 5010 to which a guarantee code CC1 was added with a guarantee code creation unit 4110. The logical block 5010 checked with a data check unit 2010 concerning the guarantee code CC1. The logical block output from the data check unit 2010 is added with data EDT encrypted with the encryption unit 2030, and output as a logical block 5020. This logical block 5020 is added with a guarantee code CC2 with a guarantee code creation unit 2510, and stored as a logical block 5032 in the host memory 220. The logical block 5032 stored in the host memory 220 is checked with a data check unit 2310 concerning the guarantee code CC2, and the checked logical block is stored as a logical block 5042 in the internal disk device 40.

Meanwhile, the logical block 5042 stored in the internal disk device 40 is encapsulated with an FC (Fiber Chanel) protocol and, after a guarantee code CC2 is added thereto with a guarantee code creation unit 2320, stored in the host memory 220. The logical block 5037 stored in the host memory 220 is checked with a data check unit 2520 concerning the guarantee code CC2, and then output to a decryption unit 2040. The decryption unit 2040 decrypts data, the decrypted logical block 5025 is checked with a data check unit 2020 concerning the guarantee code CC1, the checked logical block 5015 is checked with a guarantee code check unit 4120 of the cache memory package 400 concerning the guarantee code CC1, and the checked logical block 5005 is stored in the cache memory 420.

Figure 3:
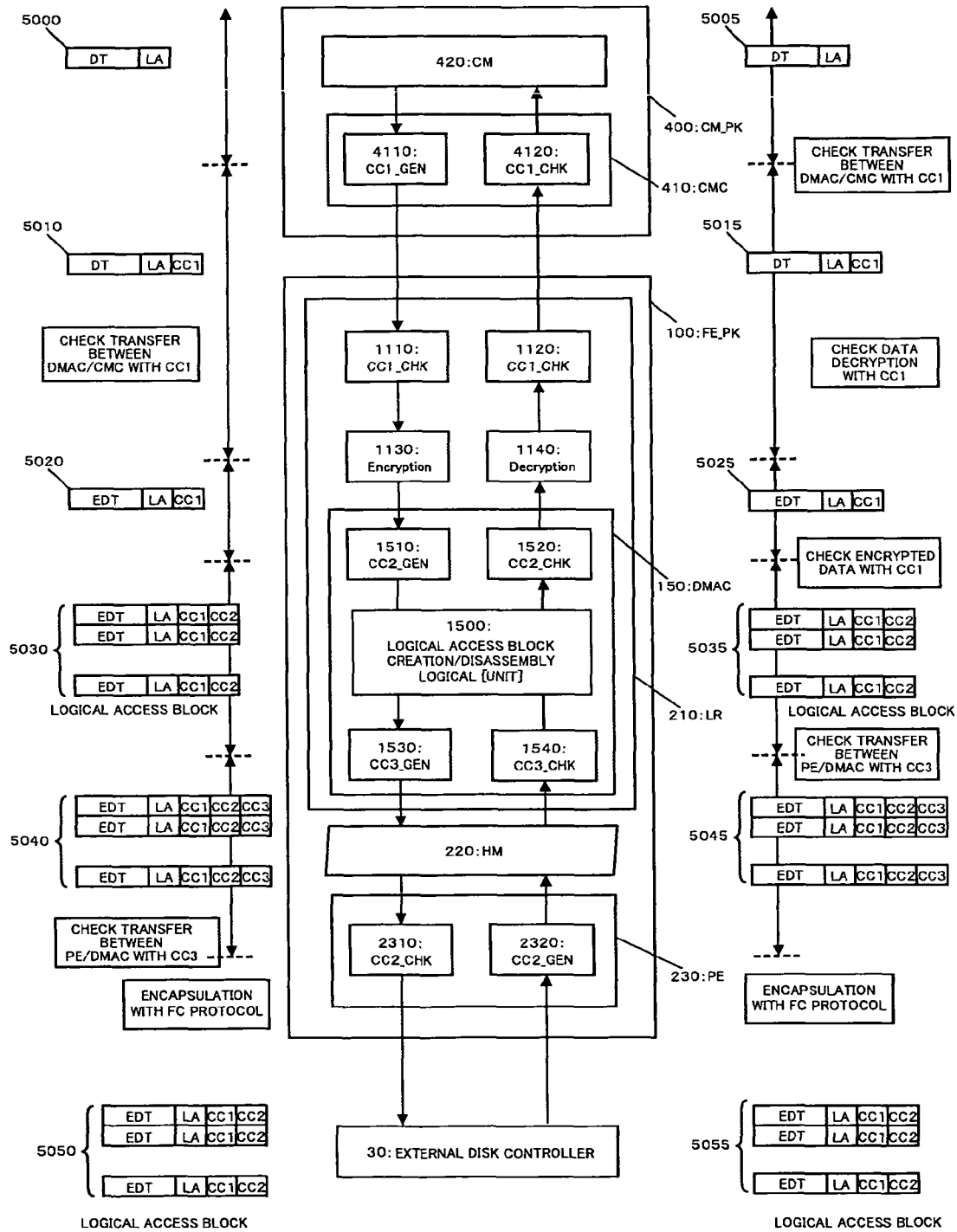
FIG. 3 is a diagram showing the configuration and change of data for explaining the processing to be performed by the disk controller to an externally-connected drive.

Meanwhile, the front-end package 102, as shown in FIG. 3, in order to control the input and output of data between the cache memory 420 and the external disk controller 30, comprises data check units 1110, 1120, an encryption unit 1130, a decryption unit 1140, a guarantee code creation unit 1510, a data check unit 1520, a logical access block creation/disassembly logical unit 1500, a guarantee code creation unit 1530, a data check unit 1540, a host memory 220, a data check unit 2310, and a guarantee code creation unit 2320.

In other words, the front-end package 102 provides the logical access block creation/disassembly logical unit 1500, the guarantee code creation unit 1530 and the data check unit 1540 between the guarantee code creation unit 1510 and the guarantee code check unit 1520, uses the logical access block creation/disassembly logical unit 1500 to create a logical access block 5030 or disassemble into a logical access block 5035, sends and receives a logical access block 5040 or a logical access block 5045 between the direct memory access controller (DMAC) 150 and the protocol engine 230 via the host memory 220, and sends and receives a logical access block 5050 or a logical access block 5055 between the protocol engine 230 and the external disk controller 30. The remaining configuration is the same as the back-end package 200. Further, the front package 100 also comprises the same functions as the front-end package 102, and the protocol engines 130 are respective connected to the host computers 20.

Figure 4:
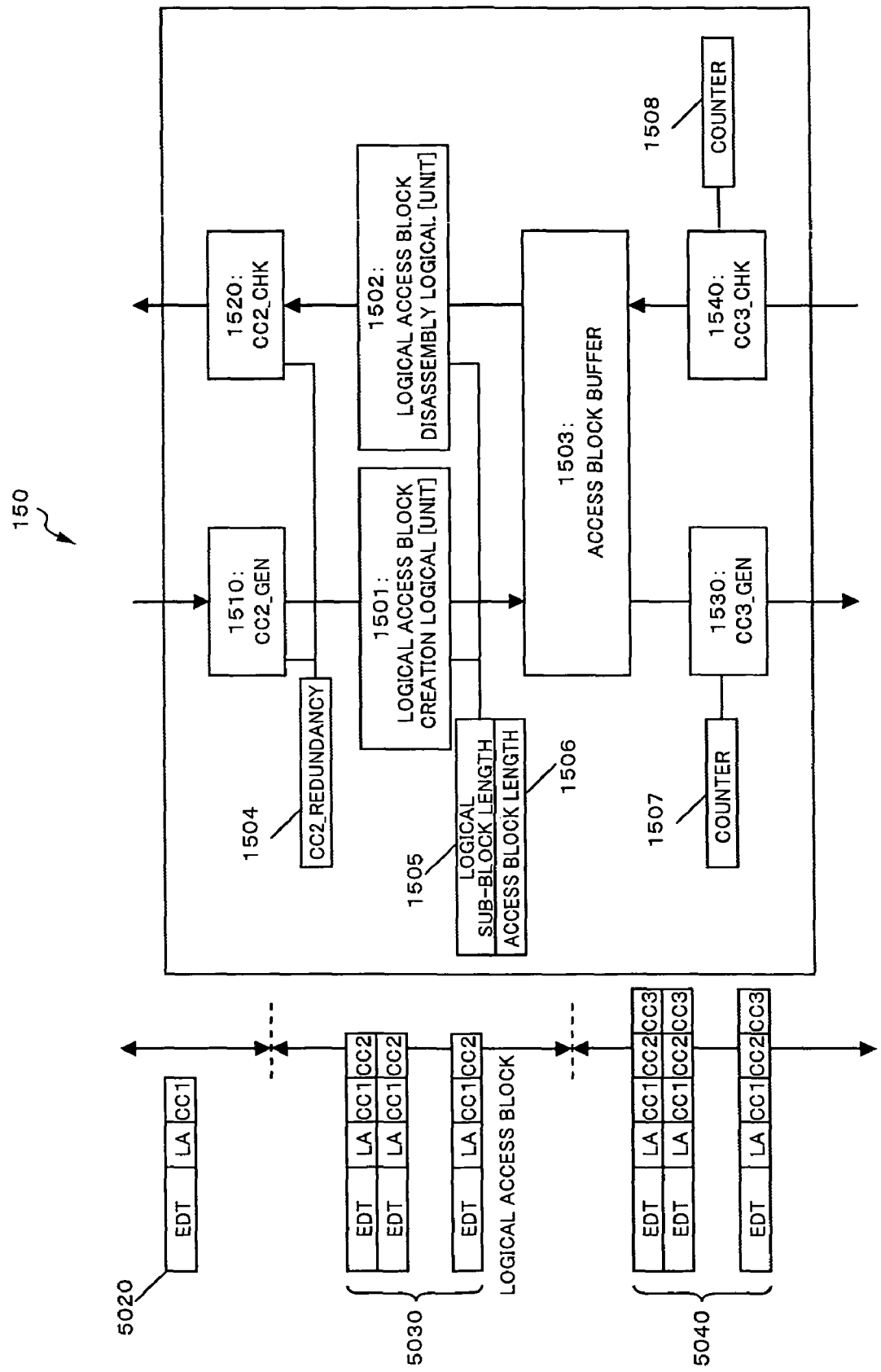
FIG. 4 is a diagram explaining the configuration of a direct memory access controller and the configuration of data.

Specifically, the direct memory access controller (DMAC) 150, as shown in FIG. 4, comprises a guarantee code creation unit 1510 for creating a guarantee code CC2, a data check unit 1520 for checking the guarantee code CC2, a redundancy setting unit 1504 for setting the redundancy of the guarantee code CC2, a logical access block creation logical unit 1501 for creating a logical access block, a logical access block disassembly logical unit 1502 for disassembling a logical access block, a logical sub-block length setting unit 1505 for setting a logical sub-block length, an access block length setting unit 1506 for setting an access block length, an access block buffer 1503, a guarantee code creation unit 1530 for creating a guarantee code CC3, a check unit 1540 for checking the guarantee code CC3, a counter 1507 for counting numbers concerning the creation of the guarantee code CC3, and a counter 1508 for counting numbers concerning the check of the guarantee code.

Processing of the logical access block creation logical unit 1501 is now explained with reference to the flowchart shown in FIG. 5A. Foremost, the logical access block creation logical unit 1501 acquires as parameters, for instance, a logical sub-block length, a logical access block length, and an access block format from the respective setting units 1505, 1506, analyzes the logical access block format (S2), acquires the logical sub-blocks (S3), creates a guarantee code such as CC3 (S4), determines whether to lengthen the logical access block length (S5), returns to the processing at step S3 when the logical access block length is not long and creates a logical access block when the logical access block length is long in order to lengthen the guarantee code length when sequential performance is requested and shorten the guarantee code length when transaction performance is requested, logical access block length, and thereby ends this processing routine. Examples of the created logical access block are shown in FIG. 6, FIG. 7 and FIG. 8.

Figure 6A:
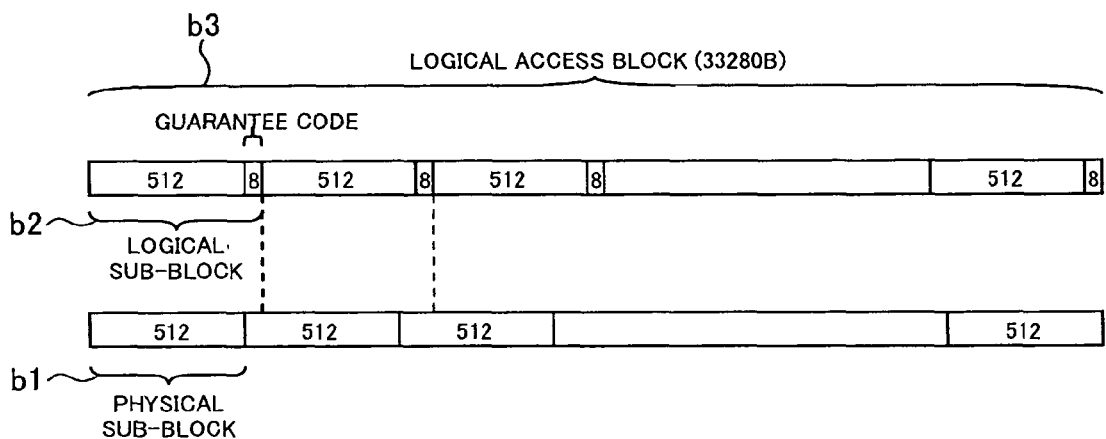
FIG. 6A and FIG. 6B are diagrams explaining the configuration of a logical access block.
Figure 6B:
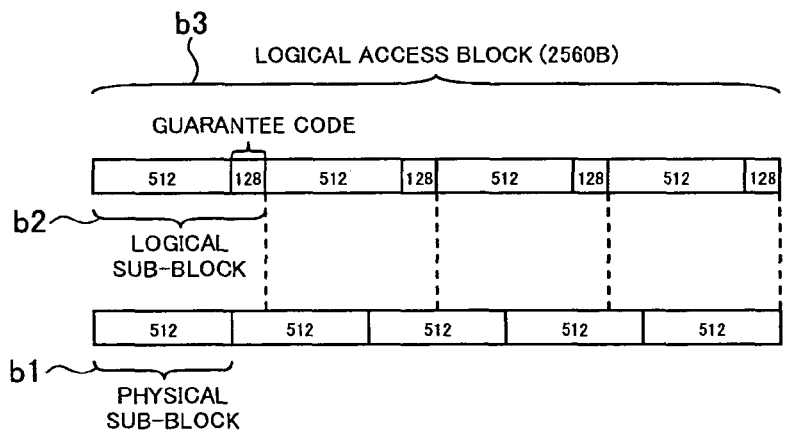

FIG. 6A shows a case where the guarantee code length (LA+CC1+CC2) is 8 B (BYTE) and the physical sub-blocks b1 in the storage devices (externally-connected drives) 30a of the external disk controller are configured in 512 B, with the logical sub-blocks b2 in the disk controller 10, data is configured in 512 B and the guarantee code is configured in 8 B, and the logical access block b3 is configured in 33280 B. FIG. 6B shows a case where the guarantee code length (LA+CC1+CC2) is 128 B (BYTE) and the physical sub-blocks b1 in the storage devices (externally-connected drives) 30a of the external disk controller are configured in 512 B, with the logical sub-blocks b2 in the disk controller 10, data is configured in 512 B and the guarantee code is configured in 128 B, and the logical access block b3 is configured in 2560 B.

FIG. 7A shows the configuration of a logical block in the disk controller 10 in which Hamming codes (D, C2) and guarantee codes LA, C1 were added to the data body DATA. FIG. 7B shows the configuration of the logical sub-blocks b2 in the disk controller 10 in which the Hamming codes (D, C2) and the guarantee codes LA, C1, C2 were further added to the logical block illustrated in FIG. 7A. FIG. 7C shows the configuration of the physical sub-blocks b1 in the storage devices (externally-connected drives) 30a of the external disk controller. FIG. 7D shows the configuration of the physical sub-blocks b1 upon adding the guarantee code C3 to the physical sub-blocks b1 in the storage devices (externally-connected drives) 30a of the external disk controller.

FIG. 8A shows the configuration of a logical block when the guarantee codes LA, C1 are added to the data body DATA. FIG. 8B shows the configuration of the logical sub-blocks b2 in the disk controller 10 in which the guarantee codes LA, C1, C2 (encrypted guarantee codes), access history Ac1 and access authority Ac2 were added to the encrypted data body DATA. FIG. 8C shows the configuration of the physical sub-blocks b1 in the storage devices (externally-connected drives) 30a of the external disk controller.

Processing of the logical access block disassembly logical unit 1502 is now explained with reference to the flowchart illustrated in FIG. 5B. Upon disassembling the logical address block, the logical access block disassembly logical unit 1502 acquires as parameters, for instance, a logical block length, a logical access block length, and an access block format (S11), analyzes the logical access format (S12), acquires the logical access block from the respective setting units 1505, 1506 (S13), disassembles the logical access block into logical sub-blocks (S14), and thereafter disassembles and verifies the guarantee code (S15). Subsequently, the logical access block disassembly logical unit 1502 determines whether the logical access block is long (S16), returns to the processing at step S14 when the logical access block is too long, ends this processing routine when the logical access block not long, and then ends this logical access block disassembly processing.

According to the present embodiment, when the disk controller 10 accesses the internal disk device 40 or the external disk controller 30, such access is made in minimum common multiple units of logical sub-blocks b2 and physical sub-blocks b1 in which a guarantee code is added to user code, and the guarantee code length, for instance, the length of the guarantee code CC2 is changed. Thus, it is possible to adjust the balance between transaction performance and data utilization while securing the reliability of data.

Specifically, as shown in FIG. 9A, by selecting the guarantee code length to be 0, 64 and 128, data utilization will become high, medium and low, and the requested transaction performance will become low, medium and high. Further, as the type of data conversion, as shown in FIG. 9B, the guarantee code length is 8 for plain text, the guarantee code length is 16 for encrypted data, the guarantee code length is 16 for compressed data, and the guarantee code length is 32 for encrypted+compressed data. Further, when 1 bit error correctable information block length is selected, the guarantee code lengths will respectively be 8, 16, 32, 64, 256 and 512 in relation to the 1 bit correctable information blocks 247, 120, 57, 26, 11 and 4.

FIG. 10 shows an example of the effect of the disk controller according to the present embodiment. The contents of the hamming code to be used here are depicted in FIG. 11. In FIG. 11, the encoding ratio is information bit/code length.

Figure 12:
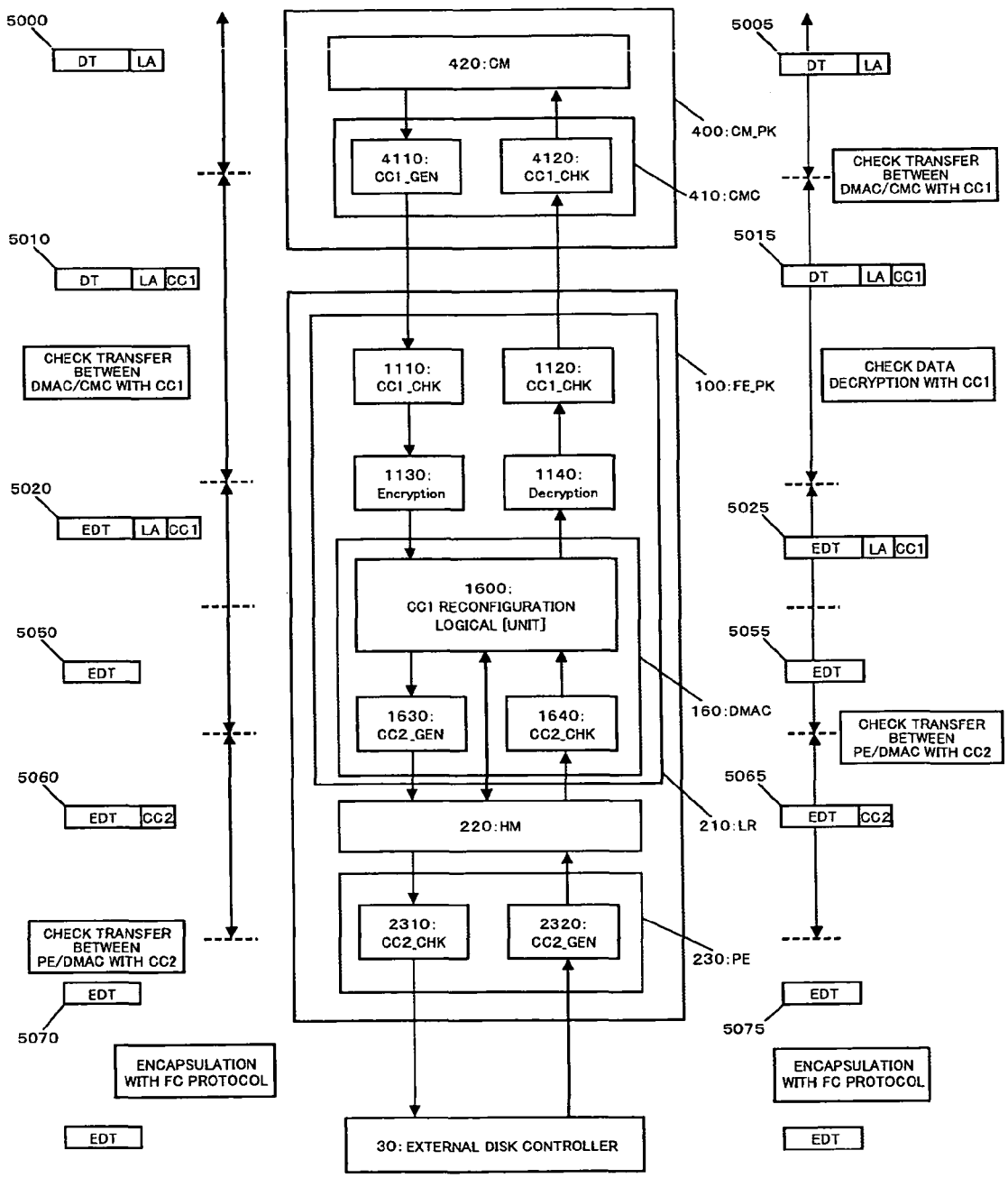
FIG. 12 is a diagram showing the configuration of the relevant parts of the disk controller and the configuration of data showing another embodiment of the present invention.

A second embodiment of the present invention is now explained with reference to FIG. 12. In this embodiment, a direct memory access controller (DMAC) 160 is used in substitute for the direct memory access controller 150, and the remaining configuration is the same as the embodiment explained with reference to FIG. 3.

In other words, the direct memory access controller 160 comprises a CC1 reconfiguration logical unit 1600 for reconfiguring the guarantee code CC1, a guarantee code creation unit 1630 for creating the guarantee code CC2, and a check unit 1640 for checking the guarantee code CC2. The direct memory access controller 160 adds a logical block 5050 and the guarantee code CC2 to the protocol engine 230 and transfers a logical block 5060 via the host memory 220, inputs a user logical block 5075 from the protocol engine 230 in a logical block 5065 via the host memory 220, checks the guarantee code CC2 of the logical block 5065, and reconfigures the checked logical block 5055 with the CC1 reconfiguration logical unit 1600 and outputs it as a logical block 5025 to the decryption unit 1140.

Figure 13:
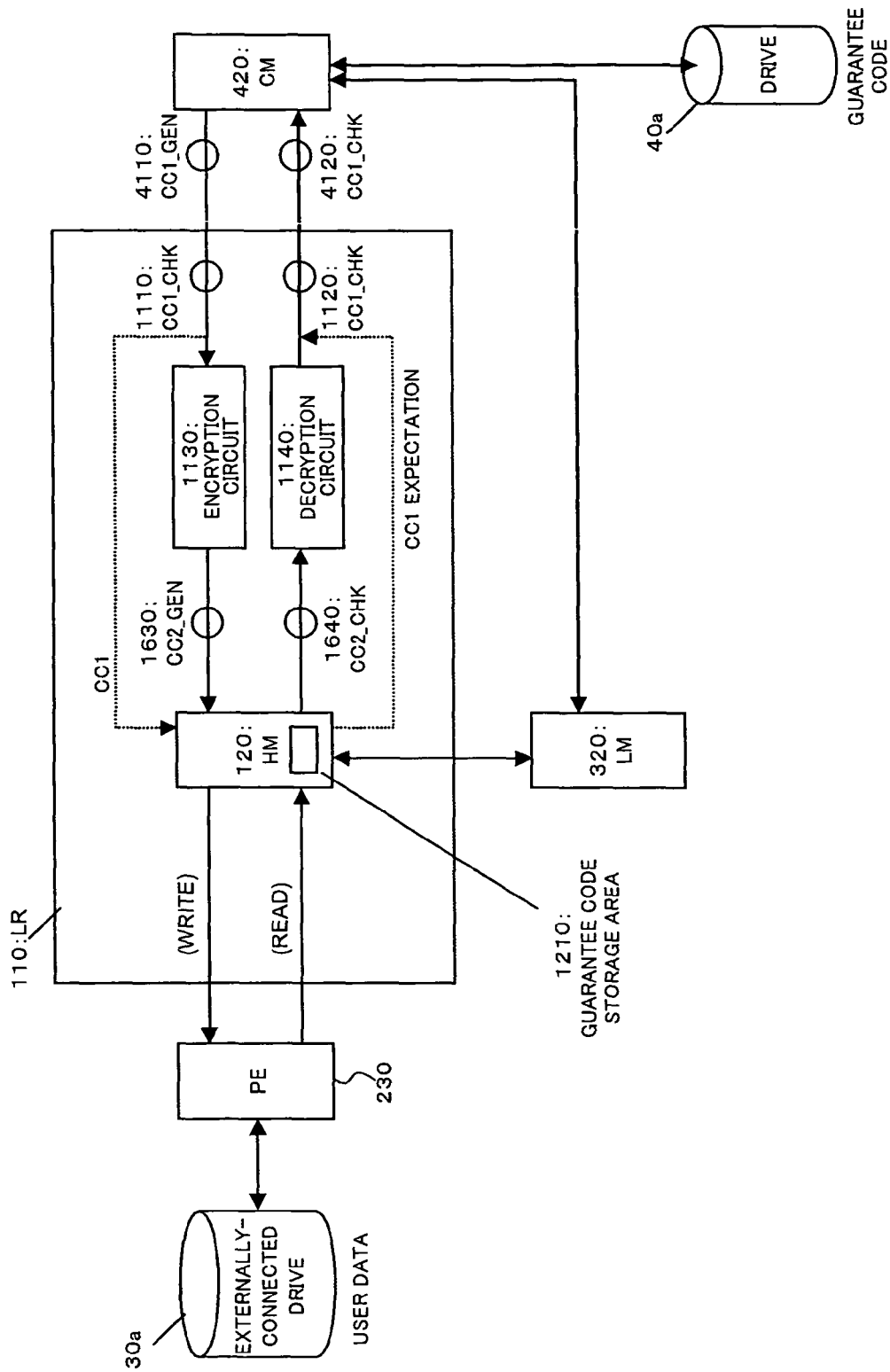
FIG. 13 is a configuration diagram explaining the relationship of a local router and an externally-connected drive.

Thereupon, the host memory 120 in the local router 210, as shown in FIG. 13, responds to a write access and stores data in the externally-connected drive 30a via the protocol engine 230, responds to a read access and incorporates the data stored in the externally-connected drive 30a via the protocol engine 230, and stores the guarantee code CC2 in the guarantee code storage area 1210. Here, data is sent and received between the host memory 120 and the local memory 320 of the microprocessor package 300, the local memory 320 sends and receives data to and from the cache memory 420, and the cache memory 420 stores data of the drive 35 storing the guarantee code CC1.

Figure 14:
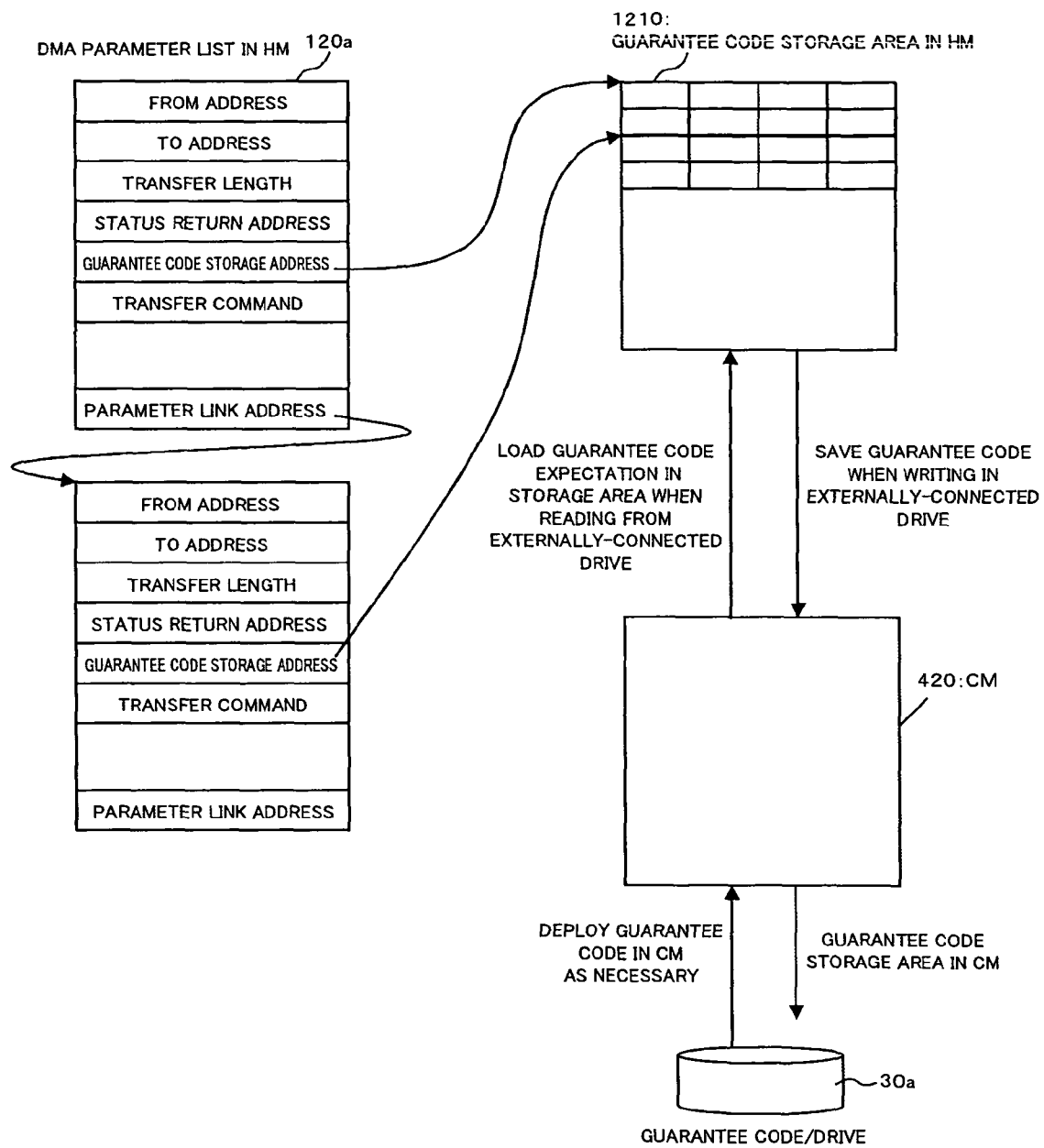
FIG. 14 is a diagram explaining the configuration of a DMA parameter list to be used by the disk controller.

Specifically, as shown in FIG. 14, the DMA parameter list 120a in the host memory 120 has a "FROM address," a "TO address," a "transfer length," a "status return address," a "guarantee code storage address," "a transfer command" . . . a "parameter link address", where the "guarantee code storage address" points to the guarantee code storage area 1210 of the host memory 120. When data is read from the externally-connected drive 30a, the guarantee code expectation is loaded into the guarantee code storage area 1210, and when data is written into the externally-connected drive 30a, the guarantee code is saved. Here, the cache memory 420 fetches the guarantee code in the cache memory, and stores the guarantee code into the guarantee code drive 30a as necessary.

Figure 15:
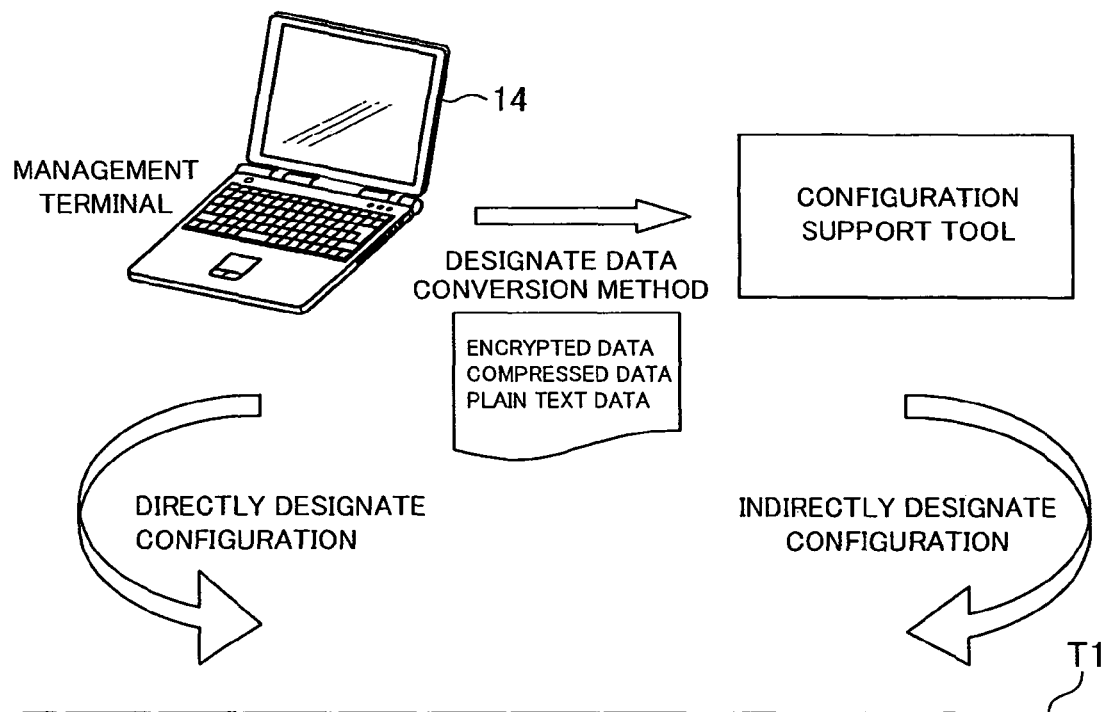
FIG. 15 is a diagram explaining a logical access block format management screen.

When managing the logical access block format, as shown in FIG. 15, contents of a table T1 are displayed as the logical access block format on a screen of the management terminal 14. Data is thereby converted by designating the size, logical sub-block length, logical access block length, guarantee code format and the like in logical volume units with a set configuration such as a parity (RAID) group. Here, if the method such as encryption or compression is designated, it is also possible to use a configuration support tool that sets the appropriate logical sub-block length, logical access block length, guarantee code format and the like.

According to the present invention, the storage device of the external disk controller 30 or the internal disk controller 40 processes the access from the disk controller 10 in physical sub-block units. When the disk controller 10 is to access the storage device of the external disk controller 30 or the internal disk device 40 in logical sub-block units in which an additional code containing a guarantee code is added to user data, it makes such access in minimum common multiple units of logical sub-blocks and physical sub-blocks, and changes the guarantee code length. It is thereby possible to improve the transaction performance while securing the reliability of data.

According to the present embodiment, since the data guarantee code stored in a side file is used when the disk controller 10 accesses the externally-connected drive, it is possible to improve the reliability of data.

What is claimed is:

1. A storage controller, comprising:
   a controller for receiving a read command and a write command from a host system; and
   a plurality of storage devices connected to said controller and from which data is read or to which data is written based on the control of said controller;
   wherein said controller includes a logical sub-block setting unit for setting logical sub-block units in which an additional code containing a guarantee code is added to user data, and an additional code length setting unit capable of changing the code length of said additional code in accordance with a performance request including transaction performance and sequential access performance, and accesses said storage devices in said logical sub-block units containing an additional code of a code length set with said additional code length setting unit;
   wherein said storage devices process the access from said controller in physical sub-block units;
   wherein said logical sub-block units and said physical sub-block units are of a different block size; and
   wherein said controller processes the access to and from said storage devices in a specific block size configured from a least common multiple of said logical sub-blocks and said physical sub-blocks.

2. The storage controller according to claim 1, wherein said storage devices include an externally-connected storage device, and said controller sets said externally-connected storage device as an access target.

3. The storage controller according to claim 1, wherein there are a plurality of guarantee codes configuring said logical sub-block units.

4. The storage controller according to claim 1, wherein said controller includes an encryption unit for encrypting data to be subject to I/O processing to and from said host system or said storage devices, a decryption unit for decrypting encrypted data among data from said host system or said storage devices, and a data check unit for checking the reliability of data encrypted with said encryption unit or data decrypted with said decryption unit according to said guarantee code.

5. The storage controller according to claim 1, wherein said additional code length setting unit changes the additional code length according to the characteristics of a business application program of said host system.

6. The storage controller according to claim 1, wherein said additional code length setting unit shortens said additional code when transaction performance is requested, and lengthens said additional code when sequential access performance is requested.

7. The storage controller according to claim 1, wherein said additional code contains a logical address.

8. The storage controller according to claim 1, wherein said additional code contains pad data for giving user-designated information.

9. A storage control method of controlling the input and output of data between a controller for receiving a read command and a write command from a host system, and a plurality of storage devices connected to said controller and from which data is read or to which data is written based on the control of said controller;

wherein said storage devices execute a step of processing the access from said controller in physical sub-block units; and wherein said controller executes:

a first step of setting logical sub-block units in which an additional code containing a guarantee code and capable of changing the code length, in accordance with a performance request including transaction performance and sequential access performance, is added to user data;

a second step of accessing said storage devices in said logical sub-block units containing said additional code of a set code length; and a third step of processing the access to and from said storage devices in a specific block size configured from a least common multiple of said logical sub-blocks having a different block size than and said physical sub-blocks units.

10. The storage control method according to claim 9, wherein said controller further executes:

a fourth step of encrypting data to be subject to I/O processing to and from said host system or said storage devices;

a fifth step of decrypting encrypted data among data from said host system or said storage devices; and a sixth step of checking the reliability of data encrypted with said encryption unit or data decrypted with said decryption unit according to said guarantee code.

11. The storage control method according to claim 9, wherein said first step includes a step of changing the additional code length according to the characteristics of a business application program of said host system.

12. The storage control method according to claim 9, wherein said first step includes a step of shortening said additional code when transaction performance is requested, and lengthening said additional code when sequential access performance is requested.

* * * * *